(12) United States Patent
Kageler et al.

(10) Patent No.: US 7,197,961 B2
(45) Date of Patent: Apr. 3, 2007

(54) BATTERY-DRIVEN SCREWDRIVER WITH A TWO-PART MOTOR HOUSING AND A SEPARATE, FLANGED GEAR UNIT

(75) Inventors: Sven Kageler, Leinfelden-Echterdingen (DE); Ginn Yuh Gan, Penang (MY); Abdul Aziz Zulfikar, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/554,015

(22) PCT Filed: Jul. 21, 2004

(86) PCT No.: PCT/DE2004/001589

§ 371 (c)(1),
(2), (4) Date: Oct. 11, 2005

(87) PCT Pub. No.: WO2005/039831

PCT Pub. Date: May 6, 2005

(65) Prior Publication Data

US 2006/0219059 A1    Oct. 5, 2006

(30) Foreign Application Priority Data

Sep. 29, 2003  (DE) ............................. 103 45 133

(51) Int. Cl.
*B25B 23/00*    (2006.01)
(52) U.S. Cl. .................... 81/52; 81/54.13; 81/451; 81/177.8; 173/217
(58) Field of Classification Search .............. 81/52, 81/54, 13, 458, 451, 452, 456, 177.8, 177.85, 81/180.1; 173/217, 170, 216
See application file for complete search history.

(56) References Cited

U.S. PATENT DOCUMENTS

| 4,751,452 | A | * | 6/1988 | Kilmer et al. ............... 320/106 |
| 4,912,349 | A |   | 3/1990 | Chang |
| 5,054,563 | A | * | 10/1991 | Zapf .......................... 173/217 |
| 5,201,146 | A |   | 4/1993 | Fushiya |
| 6,364,033 | B1 |   | 4/2002 | Hung et al. |
| D476,542 | S | * | 7/2003 | Chunn et al. .................. D8/61 |
| 6,776,069 | B2 | * | 8/2004 | Soreo et al. ................... 81/54 |
| 6,817,424 | B1 | * | 11/2004 | Su et al. ..................... 173/217 |
| 2002/0130006 | A1 |   | 9/2002 | Nakamura et al. |
| 2002/0130007 | A1 |   | 9/2002 | Nakamura et al. |
| 2003/0015066 | A1 |   | 1/2003 | Chao |

FOREIGN PATENT DOCUMENTS

| EP | 0 493 033 A1 | 7/1992 |
| EP | 0 792 724 A1 | 9/1997 |
| EP | 1 066 930 A2 | 1/2001 |
| EP | 1 240 983 A2 | 9/2002 |
| EP | 1 293 306 A2 | 3/2003 |

* cited by examiner

*Primary Examiner*—Lee D. Wilson
*Assistant Examiner*—Anthony Ojini
(74) *Attorney, Agent, or Firm*—Michael J. Striker (57) ABSTRACT

A cordless screwdriver, having a housing (12, 18) equipped with a handle (14), having an in particular permanently installed rechargeable battery (40), and having a transmission (72), is particularly compact, lightweight, and strong because the transmission (72), embodied in the form of a sun-and-planet gear, is simply inserted into a hollow, cylindrical transmission housing (18) and can be secured in position in it by an axial securing plate (62); the transmission housing (18) is also provided with an internal gearing and serves as the sun gear as well as being integrated into the reinforcing structure of the cordless screwdriver (10).

15 Claims, 10 Drawing Sheets

BATTERY-DRIVEN SCREWDRIVER WITH A TWO-PART MOTOR HOUSING AND A SEPARATE, FLANGED GEAR UNIT

BACKGROUND OF THE INVENTION

The present invention relates to a cordless screwdriver.

Cordless screwdrivers in the output class between 2.4V and 3.6V are already known, e.g. from EP 1 066 930. For the most part, they have several NiCd cells as energy storage devices, an on/off switch with a short contact button and without stepless speed control, a switch for changing between clockwise and counterclockwise rotation, a transmission that reduces the motor speed, in particular a sun-and-planet gear, and a motor with a standard diameter of 27.5 mm. There are rod-shaped and pistol-shaped designs and there are designs that have a handle with an adjustable inclination angle. These devices are either recharged by being connected to the charging unit by means of a plug—similar to a mobile phone or shaver—or are recharged by means of a cradle with contacts into which the device is placed. The cradles can be attached to a wall, for example, in order to facilitate recharging.

To this end, the charging mode must first be initiated for the charging unit and the electrical connection, but this does not occur automatically after each use. As a result, the device is often not ready for use right when it is needed, in addition to the disadvantageous impact of the known memory effect. After a certain amount of time without outputting power, NiCd cells become discharged and even when they are not used, cordless drills are partially discharged after a short period of time. If they are recharged when they are only partially discharged, then the memory effect causes them to have only the difference of the new charge quantity after the recharging process—consequently leaving them with only a reduced amount of available power.

Another disadvantage of the known cordless screwdrivers is their voluminous size due to their large components, e.g. the transmission, the switch system, and the rechargeable battery comprised of NiCd cells whose size "⅘ Sub-C", when they are situated in the handle, interferes with both ergonomics and usability because narrow, angled screw locations cannot be reached.

SUMMARY OF THE INVENTION

The cordless screwdriver according to the present invention has the advantage that it can always be quickly and safely picked up in the same place, with a fully available charge capacity, while being inexpensive to manufacture as well as exremely lightweight and handy.

This property is also due to the fact that the motor housing is composed of casing halves divided down the middle, which embrace the transmission housing from both sides in clamp fashion with inwardly protruding supporting tabs and hold it centered in the mounting position, and the transmission housing is precisely and reliably attached to the motor housing without the use of separate fastening elements such as screws or detent elements.

Further volume reduction of the cordless screwdriver is achieved through the compact design of the transmission and transmission housing; the transmission in the form of a sun-and-planet gear is simply inserted into the cylindrical housing and prevented from falling out by an axial securing plate; in addition, the housing is provided with an internal gearing and, itself, serves as the sun gear.

Embodying the motor shaft end associated with the transmission in the form of a flattened region, in particular a dihedron, and embodying the corresponding engagement opening of the transmission input shaft with the corresponding negative shape achieves a simple, easy-to-assemble, compact coupling between the motor and transmission, which additionally permits loose tolerances and also functions in a reliable manner.

At the same time, the transmission housing serves as the outer gear of the sun-and-planet gear. This eliminates an additional component and makes the device slim and compact, with a small width across corners (spindle axis to the outer contour). The tooth cross sections and tooth heights of the outer gear of the sun-and-planet gear (transmission housing) simultaneously constitute the stop for a retaining washer that serves as an axial securing device and constitutes the motor-side limitation of the planet gears of the first stage. The retaining washer has two wings protruding from its circumference, which can engage in bayonet locking fashion in two corresponding recesses of the transmission housing and can be rotated into an adjacent annular groove to prevent it from coming loose in the axial direction. This washer simultaneously serves as a transport securing device for the transmission, which can be supplied separately. In the installed state, the washer is secured between the motor and the transmission housing by means of its wings. It is also possible to use a retaining washer with protruding, bent wings that can be secured in the recesses by being press-fitted into them.

The sun-and-planet gear is provided with an autolock system, i.e. with an output spindle that automatically locks when it is rotated from the outside through the exertion of force. Its transmission housing, on the motor side at the top and bottom, has axial extensions with an annular groove and an annular bead. This annular groove is engaged by the annular beads of the casing halves, which have a corresponding counterpart profile. The transmission housing is thus contained in a captive, detent-attachable way and secured radially, axially, and without play, without the need for additional components such as screws, rivets, or detent projections. Axial counterpart extensions on the casing halves protrude laterally into the recesses in the transmission between these extensions. This placement serves to prevent the transmission housing from rotating in relation to the motor housing—without requiring the use of separate components. The axial extensions are asymmetrical so that there is only one way to assemble them.

Further weight and volume reduction of the cordless screwdriver are achieved by eliminating a chuck; a hex socket of the output shaft—which fits corresponding screwdriver or drill bits with hexagonal shafts—permits these tools to be quickly and easily changed.

Since the lithium-ion cell experiences hardly any self-discharging, the cordless screwdriver is fully ready for use even after long pauses between uses; during long pauses between uses, the cordless screwdriver can remain in the charging mode on the charging cradle for any amount of time. The charging cradle can be placed in a stable fashion on a flat supporting surface, without having to be mounted in place, and without having to be held when the cordless screwdriver is removed. It is therefore always ready to be picked up with only one hand, without having to remove a plug or release a catch. In addition, the cordless screwdriver is automatically assured of being fully charged at any time.

The compact lithium-ion cell is clamped without play in stationary fashion inside the handle region of the casing half; two welded contact tabs with electrical supply lines in its end regions are soldered to the circuit board. The cell is integrated into the reinforcing structure of the handle and increases its inherent stability while minimizing materials consumption for the casing halves of the housing.

The circuit board provided for control purposes is the mounting board for the switch-on contacts, the charging contact tabs, the slide switch for reversing directions, the two light-emitting diodes for indicating the rotation direction, and the means for controlling the charging and discharging current of the lithium-ion cell. The circuit board is also situated lengthwise inside the handle, functioning as an additional transverse rib in the reinforcing structure of the housing and/or the handle, significantly increasing its bending strength.

In lieu of a box-like on/off switch, which is standard for this class and has one position each for clockwise and counterclockwise operation, the concept of a separate preselection for clockwise/counterclockwise operation has been adopted. Whereas in drill/drivers of the prior art, a separate assembly for this purpose is mounted onto the box-like main switch, in this instance, a simple and inexpensive slide switch that is soldered to the circuit board and is, for example, a mass-produced component available on the electronics market, can be manually controlled by means of the usual slider, thus providing a simply designed reversing of the rotation direction.

An on/off button and rotation direction reversing switch are embodied so that on the one hand, when the on/off button is pressed, the rotation direction reversing switch is locked and cannot be moved and on the other hand, when the rotation direction reversing switch is in the middle position, the recommended transport position, the on/off button is locked and cannot be pushed into the on position.

The charging contact tabs soldered to the circuit board protrude through openings in the lower end of the handle and in the charge position, are contacted by counterpart contacts of the charging cradle, without having to connect any additional cable or plug connector.

Depending on the rotation direction of the motor, a green or red light-emitting diode soldered to the circuit board lights up. These LEDs are visible through openings in the housing covered by a transparent plastic part serving as a window.

The transmission housing, the circuit board with the rechargeable battery, the motor, the light-emitting diodes and electrical elements, the switch button with the contact plate and springs, and the transparent plastic part are inserted into a first casing half, enclosed by the second casing half, and these halves are secured with only four identical screws, completing the assembly and yielding a very inexpensive design.

The very compact design makes it possible to hold the device at the front of the transmission housing and/or on the adjoining motor housing in one hand so that the index finger of this hand can hold a screw against the bit and the remaining fingers can easily operate the large-area on/off button while the free hand can hold the work piece.

The use of only a single long, slender lithium-ion (Li-ion) cell permanently built into the handle of the cordless screwdriver as the rechargeable battery instead of a number of ⅘ Sub-C nickel cadmium cells makes it possible to achieve a particularly small handle circumference. A significantly reduced, extremely maneuverable size in a "slimline revolver" format is also achieved by replacing the usual box-like switch component with a contact plate, which takes up only 10% of the former's volume and is connected to the on/off button; this contact plate electrically connects two counterpart contacts to each other when the button is slid. The contact plate here is screw connected to the on/off button.

Two relatively large, hard coil springs keep the on/off button preloaded into its off position and, through rapid opening and closing of the contacts, prevent them from becoming welded to the contact plate by their high impedance, which increases over their service life.

The long on/off button has a short actuation stroke and can be actuated with particular ease to reliably switch on in any position. Regardless of the actuation position, only slight actuating forces are required and the device can be switched on conveniently in virtually any position of the operating hand. In order to improve the guidance of the on/off button in relation to the housing, it has two lateral guide tabs on the inside that are supported in sliding fashion in the housing.

The large-area rubber covering with a nubbed surface extending over the entire grip region allows the cordless screwdriver to rest in the operating hand with a particularly secure grip.

BRIEF DESCRIPTION OF THE DRAWINGS

An exemplary embodiment of the present invention will be explained in detail below in conjunction with the accompanying drawings.

DESCRIPTION OF THE PREFERRED EMBODIMENTS

Figure 1:
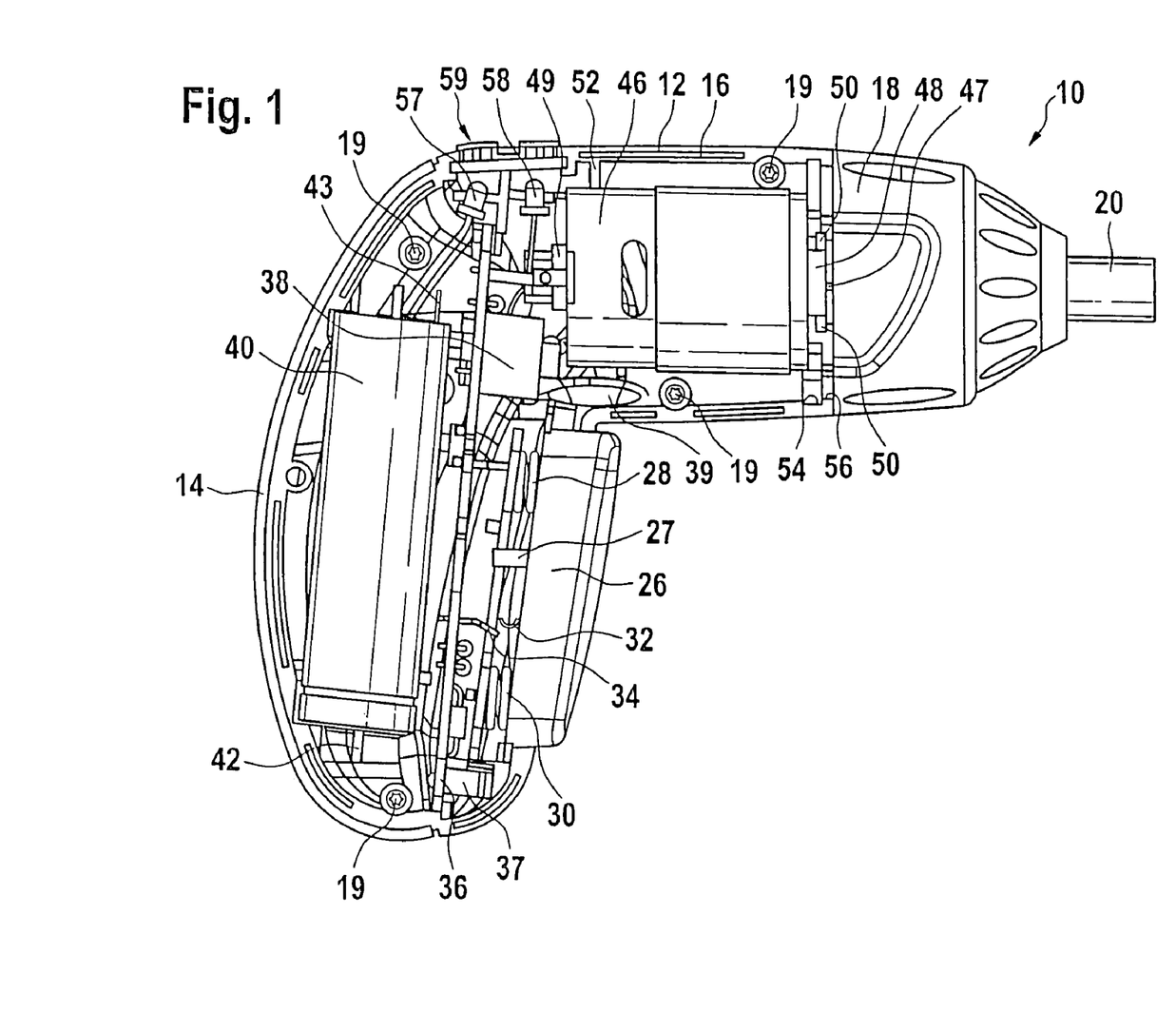
FIG. 1 is a side view of the partly open cordless screwdriver.
Figure 2:
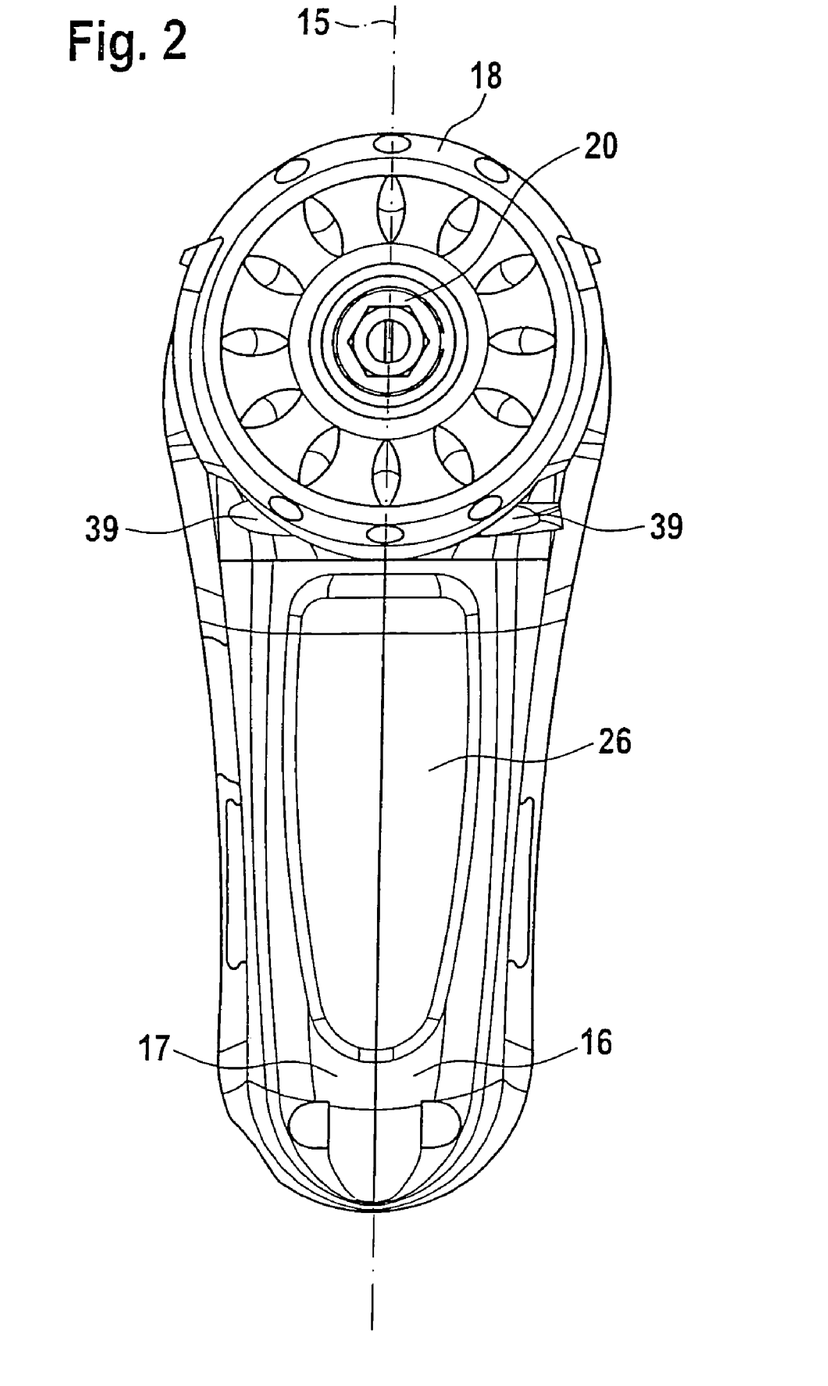
FIG. 2 is a front view of the cordless screwdriver.

FIG. 1 shows a pistol-like cordless screwdriver 10 with a motor housing 12 that is aligned with the screwdriving direction and a handle 12 situated at an angle thereto. The motor housing 12 with the handle 14 is comprised of two casing halves 16, 17 that can be snugly joined to each other along a central plane 15. To this end, four screws are inserted through bores in the one casing half 17 and engage in four screw mounts 19 in the other casing half 16, thus attaching the two halves to each other.

An on/off button 26 is provided, which extends over almost the entire inner length of the handle 14. The on/off button 26 with a screw-connected contact plate 32 cooperates with the counterpart contacts 34 affixed to the machine, thus constituting an on/off switch for the machine and eliminating the need for a separate, box-shaped standard switch or button of the kind usually provided in the trade. The particular length of the on/off button 26 makes it easy to switch on and off, even when the cordless screwdriver 10 is being held in difficult positions. Its longitudinal sides are provided with supporting tabs 27 that protrude laterally into the handle 14, constituting a secure guidance along corresponding counterpart surfaces in the casing halves 16, 17 and permitting a precise, play-free back-and-forth motion.

Two hard compression springs 28, 30 elastically support the on-off button 26 on the handle 14 so that after the screwdriver is switched on, as soon as the on/off button 26 is released, the springs 28, 30 automatically guide it back to its off position, separate the contacts 32, 34, and stop the movement of the motor. The actuation stroke is delimited by stops, not shown in detail, and is very short and user-friendly when it is 1 to 4 mm long.

To accommodate entry of the on/off button 26 into the motor housing 12, a corresponding opening 29 is situated halfway in each of the casing halves 16, 17, which tightly encloses the on/off button 26 so that it is guided as though in a slot. On its top and bottom ends oriented toward the handle 14, the on/off button 26 has respective longitudinally extending tabs that protrude beyond the opening 29 and are supported against the inside along the edge of the opening, thus holding the on/off button 26 supported against these opening edges in the off position, preventing it from coming out of the housing 12.

The counterpart contacts 34 associated with the contact plate 32 are situated on an oblong circuit board 36 extending inside the handle 14, opposite from the contact plate 32 and within its movement range. The circuit board 36 also has two symmetrically situated charging contact tabs 37 that protrude out from the plane of the circuit board 36 at right angles and then each form large contact surfaces that are bent outward at the end. These large contact surfaces extend through each of the two casing halves 16, 17 symmetrical to the central plane 15 at the lower end of the handle 14. As a result, the contact surfaces are embedded in a "recessed" position within the handle contour at each of the through openings and are accessible to the outwardly protruding charging contacts 23 of the charging cradle 22, which overlap them in the charging state when the screwdriver is resting on the charging cradle 22 and, due to their resilient design, are supported on them in a reliably contacting manner.

The circuit board 36 also has flat, close-to-the-surface interference resistors and capacitors, not shown in detail, approximately in the middle, has the slide switch 38 in the upper region, and has two light-emitting diodes 57, 58 at the upper end for visually indicating the rotation direction.

The circuit board 36 is situated with its long side parallel to the handle 14 and its short end oriented transversely in relation to the central plane 15 and is clamped without play in groove-like recesses, not shown in detail, in both of the casing halves 16, 17 so that it rests against the casing halves 16, 17 from the inside and thus constitutes a reinforcing rib in the handle 14. Parallel to the circuit board 36, a lithium-ion cell with the known advantages is accommodated in the handle 14 as the rechargeable battery 40, is embraced and secured in position in clamp fashion by the two casing halves 16, 17 in the assembled state, and is thus integrated into the reinforcing structure of the housing 12. The rechargeable battery 40 has a contact plate 42, 43 at the top and bottom; these contacting plates serve as soldering tags and are wired to the circuit board 36.

Above the on/off button 26 at the join between the inclined handle 14 and the motor housing 12, a sliding pushbutton 39 is situated so that it can be slid back and forth transversely in relation to the central plane 15 of the motor housing 12 through lateral openings, not shown, in the casing halves 16, 17. By means of a recess approximately in the center, not shown in detail, the sliding pushbutton 39 functions like a fork embracing a slide mechanism 41 of a box-like slide switch 38 affixed in the upper region of the circuit board 36. The sliding pushbutton 39 can be used to move the slide mechanism 41, which is placed against the slide switch 38, into the lateral positions furthest to the left and right and into a middle position.

Once installed, a DC motor 46 in the front region of the motor housing 12 is embraced in clamp fashion by the casing halves 16, 17 and is held without play in its operating position, oriented parallel to the transmission housing 18 inserted into the motor housing 12. At the front and rear, the motor 46 has a step-like motor collar 48, 49 from which the front and rear ends of the motor shaft 45 protrude. The motor 46 is supported in a centered fashion, with its front and rear motor collars 48, 49 resting on corresponding pedestal-like ribs of the casing halves 16, 17. The front end 47 of the motor shaft 45 is provided with a flattened region or a dihedron, in particular is shaped into this form, and in the installed position, this flattened region or dihedron engages in a correspondingly flattened opening in an input pinion 66 of the transmission 65, which is contained in the transmission housing 18 and embodied in the form of a sun-and-planet gear. This creates a nonpositive, frictionally engaging coupling that has a loose tolerance and is easy to assemble; the motor 46 can be easily slid together with the transmission 65 and the transmission housing 18 and in this preassembled state, inserted into one of the casing halves 16, 17 for further assembly.

At the end, a transmission housing 18 provided in the form of a separate cylindrical subassembly is embraced by the two casing halves 16, 17 in a clamp-like, form-locked fashion without play. In two tab-like partially cylindrical extensions 60 extending axially in relation to the motor housing 12, this transmission housing 18 contains an annular housing groove 54 delimited by an annular bead 55. The annular bead 55 engages in a matching counterpart annular groove 56 on the inside at the ends of the casing halves 16, 17 of the motor housing 12; matching counterpart annular grooves 53 of the casing halves 16, 17 engage in a form-locked manner in the annular housing groove 54 of the transmission housing 18.

In a way that prevents incorrect assembly, the two asymmetrical recesses between the two extensions 60 of the transmission housing 18 are engaged without play by counterpart extensions 61 that are bent transversely in relation to the longitudinal direction of the motor housing 12 and, functioning like pedestals, simultaneously support the motor collar 58 of the motor 46 in a centered position so that it, too, is integrated into the reinforcing structure of the motor housing 12. Separate fastening elements such as screws or the like are not required. This simplifies assembly by reducing the number of separate parts.

At the top rear, the motor housing 12 contains an inserted transparent window 59, which extends longitudinally in the dividing plane and is split down the middle. Two openings in the casing halves 16, 17 permit a blue and a red light-emitting diode 57, 58 to be seen, each associated with a rotation direction of the motor shaft 45 and designed to light up when rotation occurs in the associated direction.

From the front of the transmission housing 18, which tapers to a rounded cone at the front, protrudes an output spindle 20, which is embodied at its end in the form of a hex socket 21 to accommodate matching standard bits. The hex socket 21 is provided with means that prevent an inserted screwdriver bit or drill bit from falling out so that a certain resistance must be overcome by hand in order to remove them in the axial direction.

Figure 3:
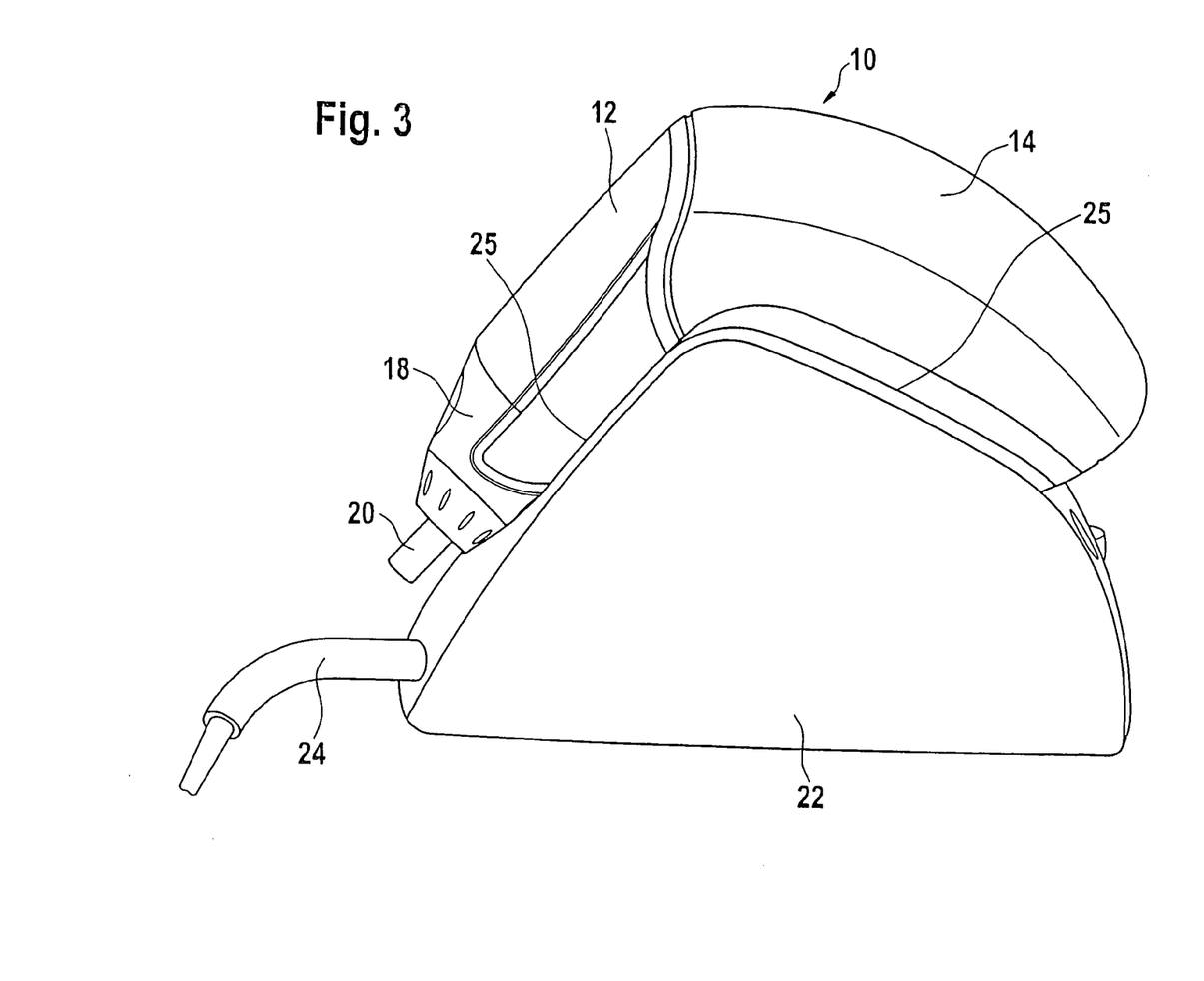
FIG. 3 is a side view of the cordless screwdriver placed in a charging cradle.

FIG. 3 shows a relatively slender, box-shaped charging cradle 22 whose outer contour is embodied with inclined surfaces to match those of the pistol-shaped inner and/or outer contour of the cordless screwdriver 10 and has a groove-like recess. This allows the inside of the cordless screwdriver 10 to be inserted without play into matching beds 25 for the handle 14, the motor housing 12, and the transmission housing 18 and to rest securely by means of its own weight, producing a particularly reliable contact between the charging contact tabs 38 and the charging contacts 23 of the charging cradle 22.

The charging contacts 23 protrude from the contour of the charging cradle 23 so that the handle 14 of the cordless screwdriver 10 engages in a corresponding recess in the charging cradle 12 and in so doing, the dead weight of the tool is supported with its charging contact tabs 37 against the resilient charging contacts 23 of the charging cradle 22. Merely placing the cordless drill 10 onto the charging cradle 22 immediately initiates the charging state with an audible click.

The charging cradle 22 has an electrical plug contact, not shown in detail, situated on the left in the viewing direction and designed for insertion of an electric connecting cable 24 to supply power to the charging cradle 22, which in the rear region associated with the handle 14 of the cordless screwdriver 10, has a charging control light 71 and a vertical insertion opening 73 to hold a screwdriver bit or drill bit.

The cordless screwdriver 10 rests with its inside, in particular with its on/off button 26, against the top of a charging cradle 22 and automatically assumes a secure charging position when resting there, provided that the charging cradle 22 is connected to an appropriate power supply via the cable 24.

Figure 4:
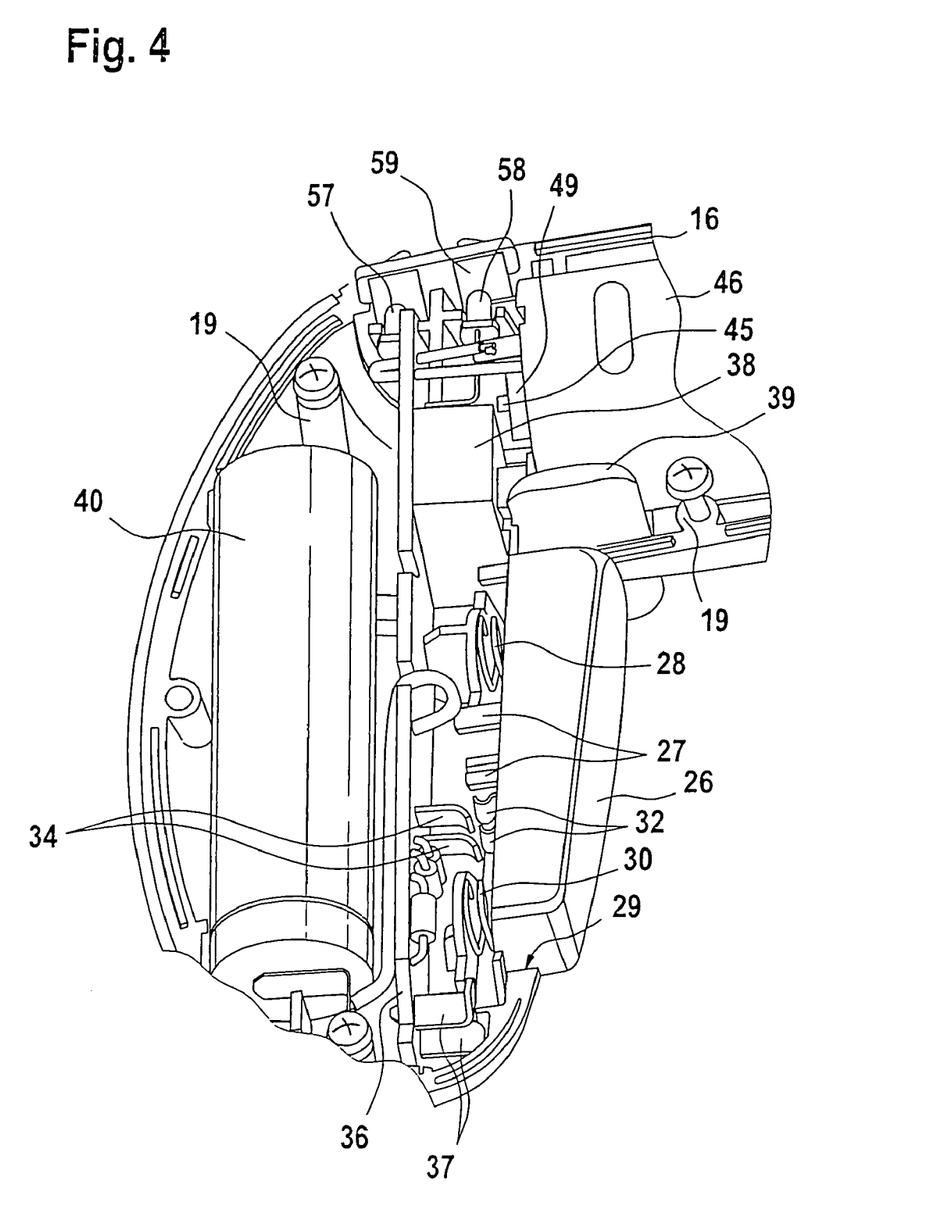
FIG. 4 shows an enlarged detail of the contact button from FIG. 1.

FIG. 4 shows an enlarged detail of the first casing half 16 with the inserted individual parts from FIG. 1, clearly showing the design of the rechargeable battery 40 with the adjacent parts and the circuit board 36 with the components fastened to it and the on/off button 26.

Figure 5:
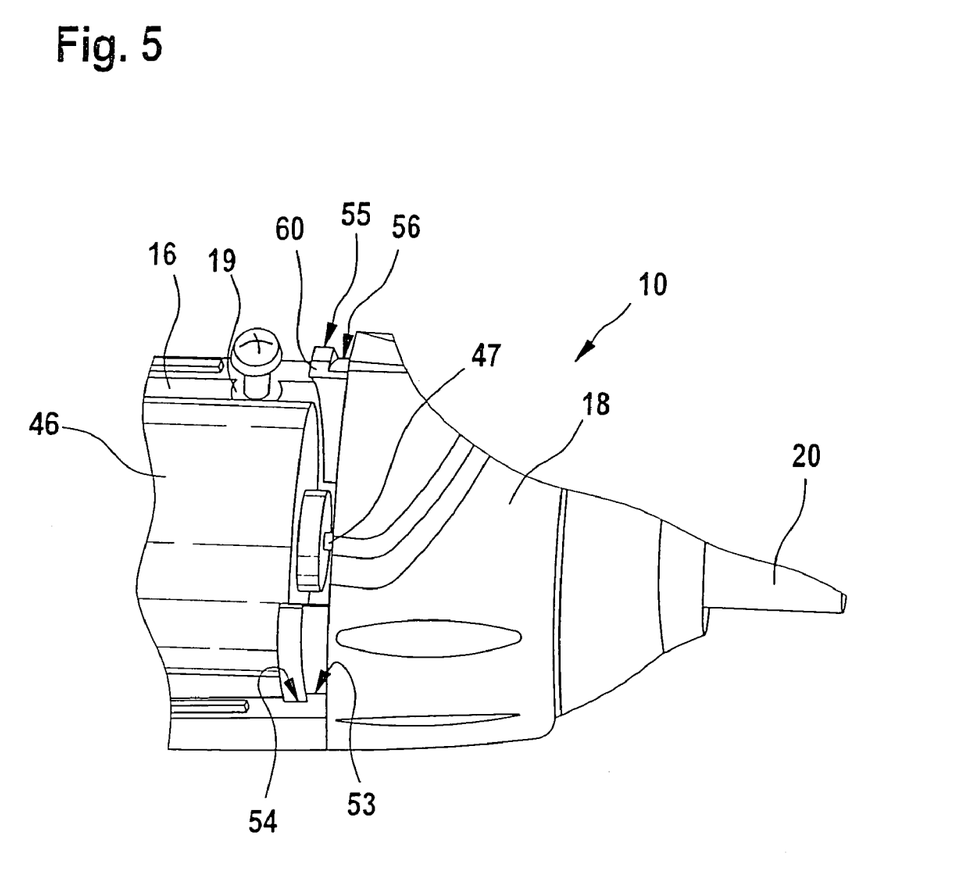
FIG. 5 shows an enlarged detail of the transmission housing from FIG. 1.

FIG. 5 shows an enlarged detail of the front region of the cordless screwdriver 10, with the lower casing half 16, looking toward the motor 46 and the transmission housing 18, which are inserted into it in a form-locked manner.

Figure 6:
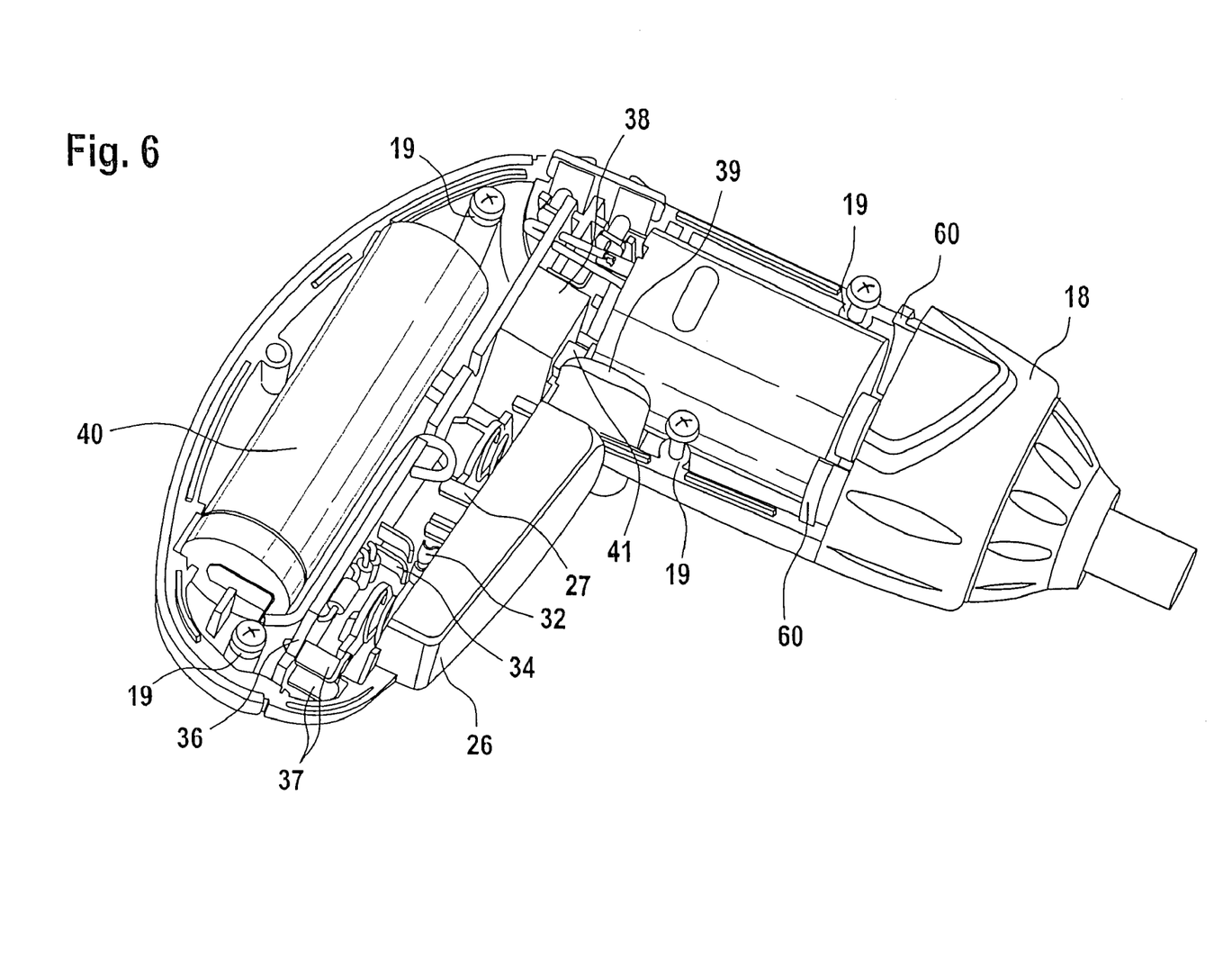
FIG. 6 is a slightly rotated view according to FIG. 1.

FIG. 6 is a perspective view according to FIG. 1, with the corresponding details from FIG. 1, this time also clearly showing the sliding pushbutton 39 for reversing the rotation direction, which in its middle position, also serves as a switch-on safety lock for the actuation of the on/off button 26. In this position, an undesired activation is not possible, for example when transporting the tool in a pants pocket.

Figure 7:
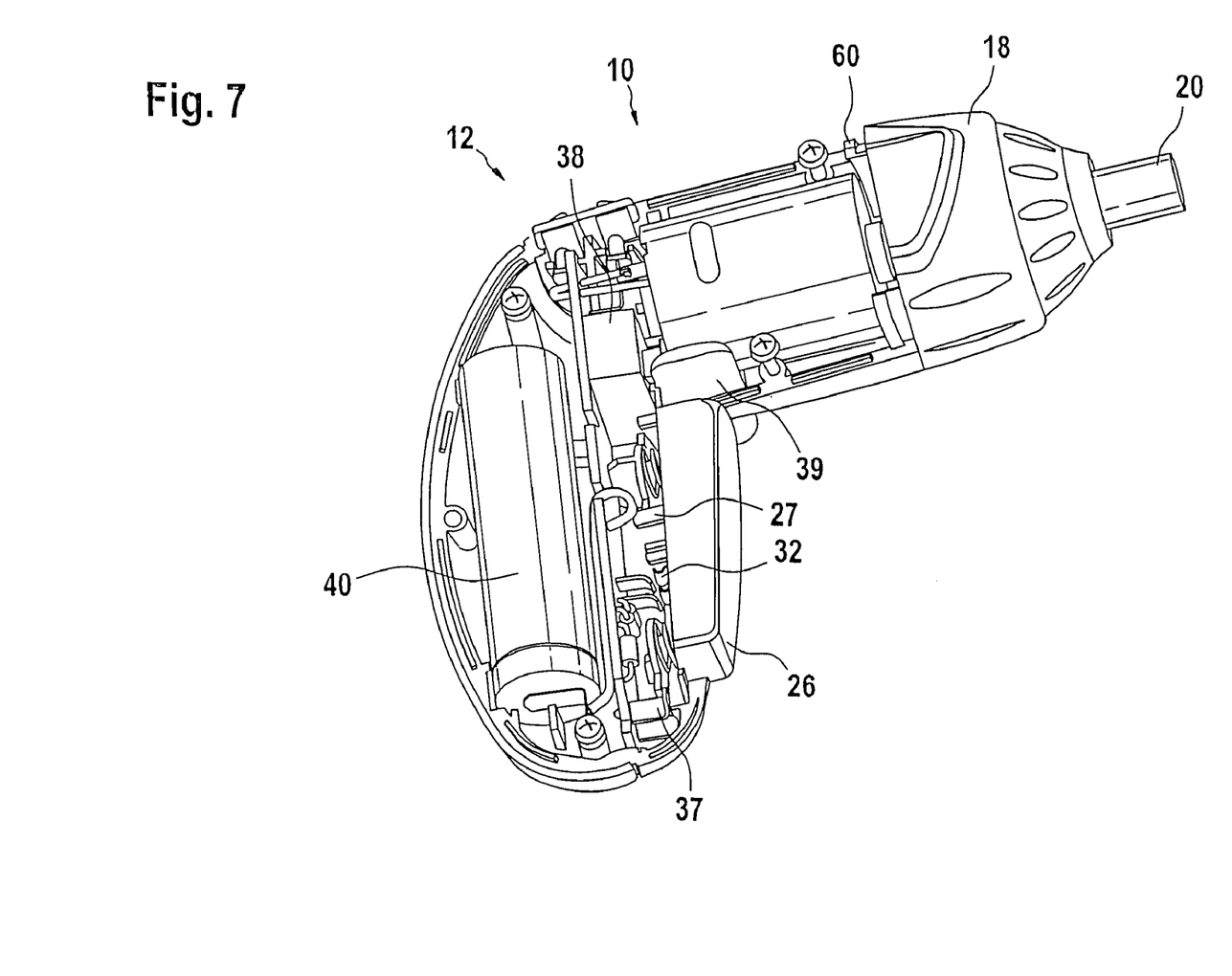
FIG. 7 is a slightly rotated view according to FIG. 6.

FIG. 7 is another three-dimensional view according to FIGS. 1 and 6; the details described with reference to these figures need not be repeated, but this figure is intended to improve comprehension of them.

Figure 8:
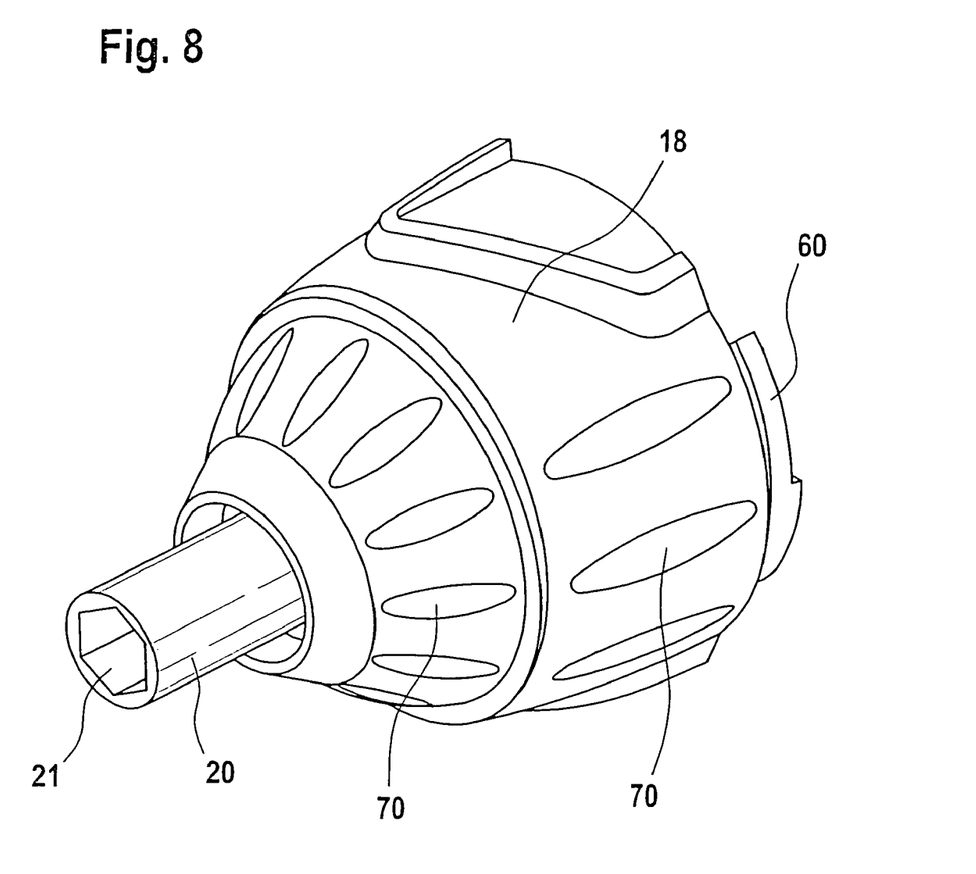
FIG. 8 is a three-dimensional front view of the transmission housing.

FIG. 8 is a detail view of the end of the transmission housing 18 with an installed transmission 65, the output shaft 20 with the hex socket 21 protruding from the front, and the axial extensions 60 protruding toward the rear; regularly spaced oval recesses 70 on the outside of the transmission housing 18 make it easier to grasp.

Figure 9:
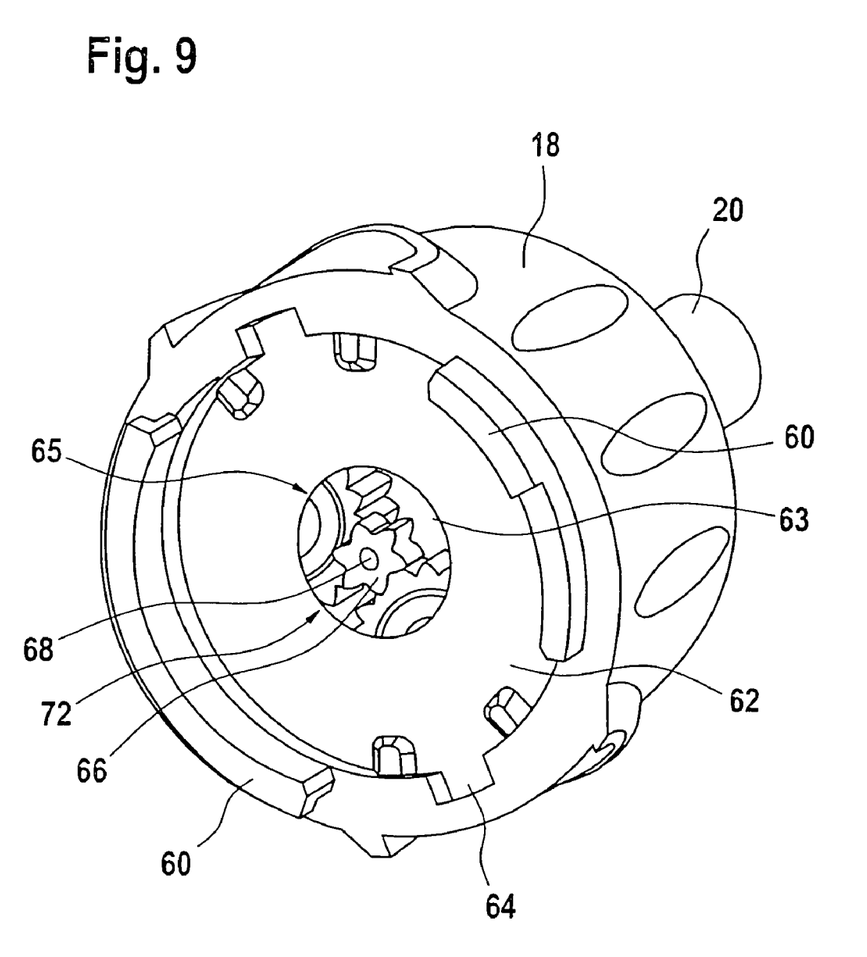
FIG. 9 is a three-dimensional rear view of the transmission.

FIG. 9 is a rear view of the transmission housing 18 according to FIG. 8, which is cylindrical at the back, showing the two axial extensions 60 and the spaces between them, as well as a spring washer 62 that has a central opening 63 and is mounted inside the transmission housing 18, extending over its entire inner diameter.

The spring washer 62 has radially protruding wings 64 by means of which it can be inserted in bayonet fashion into corresponding recesses in the circumference of the rear end of the transmission housing 18 and, by being rotated and/or caulked, can engage therein.

The input shaft 66 of the transmission 65 can be accessed through the central opening 63 to produce the engagement with the motor shaft 47 and can be coupled to its flattened end so that it can be reliably driven to rotate. The input shaft 66 has a central recess 68 that constitutes the negative form of the flattened end of the motor shaft 47.

Figure 10:
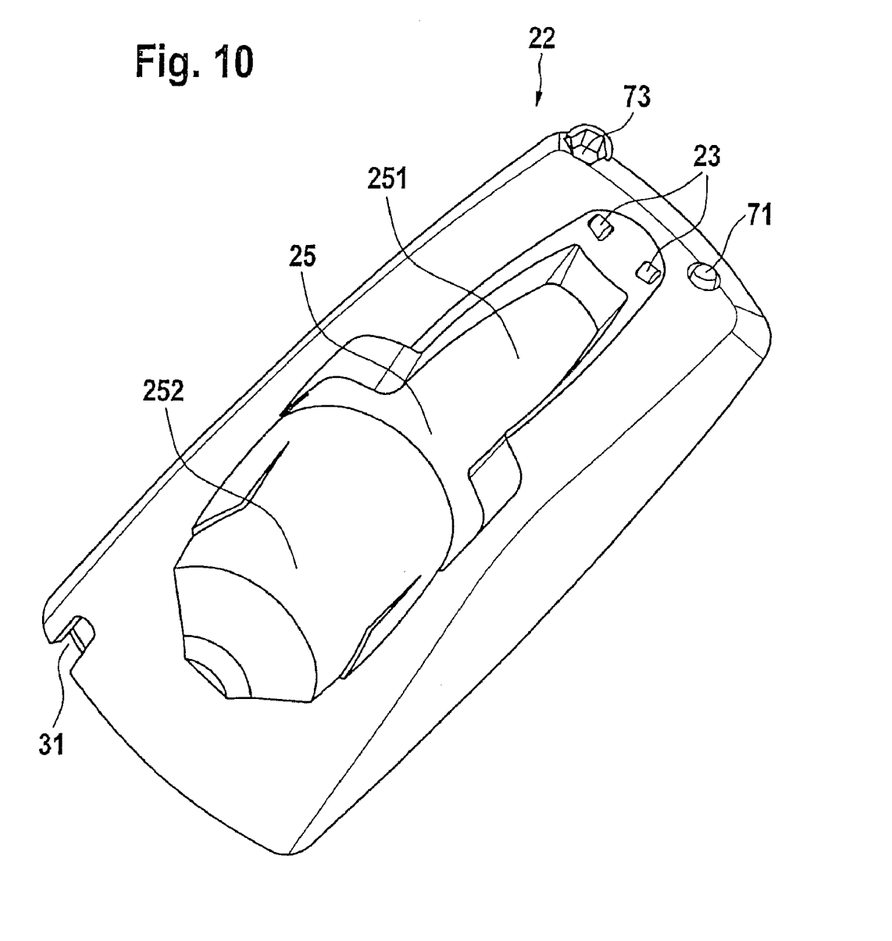
FIG. 10 is a three-dimensional top view of the charging cradle.

FIG. 10 is a top view of the charging cradle 22, showing the bed 25 that is divided into a handle bed 251 and a transmission housing bed 252 so that the cordless screwdriver 10 can be inserted precisely and almost without play into the charging cradle 22 in a clear, foolproof manner so that it rests there securely and its charging contact tabs 37 (FIGS. 1, 2, 4, 6, 7) reliably contact the charging contacts 23 of the charging cradle 22.

What is claimed is:

1. A cordless screwdriver having a motor housing (12) that is composed of casing halves (16,17), is equipped with a rechargeable battery (40), and is adjoined by a transmission housing (18) containing a transmission (72) equipped with an output spindle (20), wherein the casing halves (16,17) of the motor housing (12), solely with their c-shaped ends adjoining the transmission housing (18), embrace in clamp-like fashion and extend through axial, tab-like extensions (60), of the transmission housing (18), and hold the transmission housing (18) in a centered, non-rotational manner without play.

2. The cordless screwdriver as recited in claim 1, wherein groove/spring connections (60, 53, 54, 55, 56, 60, 97) that engage each other radially are situated between the cylindrical, one-piece transmission housing (18) and the casing halves (16,17) of the motor housing (12), with a flush transition between the outer contours of these housings at a circular butt joint.

3. The cordless screwdriver as recited in claim 1, wherein the groove/spring connections constitute radial plug-type connections between the casing halves (16,17) in such a way that the transmission housing (18), when it is plugged radially into one of the casing halves (16,17) that is oriented with its opening facing upward, is attached to it in a manner that prevents it from falling out.

4. The cordless screwdriver as recited in claim 1, wherein the motor shaft end (47) associated with the transmission (72) has at least one flattened region, preferably two, and an engagement opening (66) of the transmission input shaft has a corresponding negative shape.

5. The cordless screwdriver as recited in claim 1, wherein in the transmission (72) in the form of a sun-and-planet gear is inserted into a hollow, cylindrical transmission housing (18) and a spring washer (62) or an axial securing plate is able to secure it in position therein; the transmission housing (18) is also provided with an internal gearing and serves as a sun gear.

6. The cordless screwdriver as recited in claim 1, wherein the spring washer (62) is supported against the internal gearing of the transmission housing (18).

7. The cordless screwdriver as recited in claim 1, wherein the spring washer (62) has two wings (64) protruding from its circumference; it is possible to secure these wings against axial loosening by engaging them in bayonet locking fashion in two corresponding axial recesses of the transmission housing (18) and/or by pressing them and/or rotating them into these recesses.

8. The cordless screwdriver as recited in claim 1, wherein the sun-and-planet gear (72) is provided with an autolock system so that the rotation of the output spindle (20) locks when a torque is exerted on it from the outside.

9. The cordless screwdriver as recited in claim 1, wherein its transmission housing (18), on the motor side, in particular at the top and bottom, has tab-like axial extensions (60) with an annular groove (54) and an annular bead (53).

10. The cordless screwdriver according to the preamble to claim 1, wherein the casing halves of the motor housing (12) engage in this annular groove and annular bead with a corresponding counterpart profile, thus permitting the casing halves to be axially and radially coupled to each other without play in a non-detachable manner.

11. The cordless screwdriver as recited in claim 1, wherein axial counterpart extensions of the casing halves protrude into the tooth gap-like intermediate spaces between the axial extensions and serve to prevent the transmission housing from rotating in relation to the motor housing.

12. The cordless screwdriver as recited in claim 1, wherein the axial extensions (60) of the transmission housing (18) and the protrusions (50, 51) of the motor housing (12) are situated asymmetrically in order to prevent incorrect assembly.

13. The cordless screwdriver as recited in claim 1, wherein the motor and/or the transmission housing and/or the rechargeable battery and/or the circuit board inside the casing halves are integrated into the reinforcing structure of the motor housing (12) and/or the handle (14) so that they increase its inherent stability with a minimum of material consumption.

14. The cordless screwdriver as recited in claim 1, wherein on each casing half (16, 17), the handle (14) has a rubber covering that covers a large area, bulges outward, and is provided with a nubbed structure.

15. A cordless screwdriver having a motor housing (12) that is composed of casing halves (16, 17), is equipped with a rechargeable battery (40), and is adjoined by a transmission housing (18) containing a transmission (72) equipped with an output spindle (20), wherein the casing halves (16, 17) of the motor housing (12), solely with their c-shaped ends adjoining the transmission housing (18) with an annular counterpart bead (53) embossed on the inside and an annular housing groove (54), embrace in clamp-like fashion and extend through axial, tab-like extensions (60) embodied in the form of axial teeth provided with annular counterpart profiles, of the transmission housing (18), and extend with protrusions configured as pedestals (50), between the extensions (60) and hold the transmission housing (18) in a centered, non-rotational fixed manner without play.

* * * * *